US007207004B1

(12) United States Patent
Harrity

(10) Patent No.: US 7,207,004 B1
(45) Date of Patent: Apr. 17, 2007

(54) CORRECTION OF MISSPELLED WORDS

(76) Inventor: Paul A. Harrity, 7421 Beckwith La., Clifton, VA (US) 20124

( * ) Notice: Subject to any disclaimer, the term of this patent is extended or adjusted under 35 U.S.C. 154(b) by 319 days.

(21) Appl. No.: 10/896,951

(22) Filed: Jul. 23, 2004

(51) Int. Cl.
*G06F 15/00* (2006.01)

(52) U.S. Cl. .................................................. 715/533

(58) Field of Classification Search ................ 715/500, 715/532, 533
See application file for complete search history.

(56) References Cited

U.S. PATENT DOCUMENTS

| | | | | |
|---|---|---|---|---|
| 4,910,765 A * | 3/1990 | Matsuse et al. | ......... | 379/100.09 |
| 5,325,444 A * | 6/1994 | Cass et al. | .................. | 382/177 |
| 5,369,714 A * | 11/1994 | Withgott et al. | ............ | 382/177 |
| 5,483,629 A * | 1/1996 | Motoyama et al. | ......... | 715/514 |
| 5,706,496 A * | 1/1998 | Noguchi et al. | ................ | 707/3 |
| 5,765,180 A | 6/1998 | Travis | | |
| 5,907,839 A | 5/1999 | Roth | | |
| 6,047,300 A * | 4/2000 | Walfish et al. | ............... | 715/533 |
| 6,052,714 A * | 4/2000 | Miike et al. | ................. | 709/217 |
| 6,128,635 A * | 10/2000 | Ikeno | .......................... | 715/532 |
| 6,169,999 B1 * | 1/2001 | Kanno | ......................... | 715/532 |
| 6,173,253 B1 * | 1/2001 | Abe et al. | ...................... | 704/10 |
| 6,286,064 B1 * | 9/2001 | King et al. | ..................... | 710/67 |
| 6,349,295 B1 | 2/2002 | Tedesco et al. | ................. | 707/3 |
| 6,424,983 B1 * | 7/2002 | Schabes et al. | .............. | 715/533 |
| 6,601,059 B1 | 7/2003 | Fries | | |
| 6,704,698 B1 * | 3/2004 | Paulsen et al. | ................. | 704/1 |
| 6,785,869 B1 * | 8/2004 | Berstis | ........................ | 715/532 |
| 6,813,381 B2 * | 11/2004 | Ohnishi et al. | .............. | 382/192 |
| 6,853,993 B2 * | 2/2005 | Ortega et al. | ................... | 707/5 |
| 2002/0010726 A1 * | 1/2002 | Rogson | ....................... | 707/533 |
| 2002/0029206 A1 * | 3/2002 | Satoh et al. | .................... | 707/1 |
| 2002/0143828 A1 * | 10/2002 | Montero et al. | ............. | 707/533 |
| 2002/0194229 A1 | 12/2002 | Decime et al. | | |
| 2003/0145285 A1 * | 7/2003 | Miyahira et al. | ............ | 715/533 |
| 2003/0171910 A1 | 9/2003 | Abir | | |
| 2003/0221198 A1 * | 11/2003 | Sloo | ............................ | 725/136 |
| 2004/0030543 A1 * | 2/2004 | Kida et al. | ....................... | 704/8 |
| 2004/0107102 A1 * | 6/2004 | Chung et al. | ................ | 704/260 |
| 2004/0111404 A1 * | 6/2004 | Mano et al. | .................... | 707/3 |
| 2004/0153312 A1 * | 8/2004 | Yamamoto | ..................... | 704/10 |
| 2004/0181759 A1 * | 9/2004 | Murakami et al. | ........... | 715/532 |
| 2004/0205672 A1 * | 10/2004 | Bates et al. | .................. | 715/533 |
| 2005/0027731 A1 * | 2/2005 | Revel | ........................... | 707/101 |
| 2005/0131884 A1 * | 6/2005 | Gross et al. | .................... | 707/3 |
| 2005/0154690 A1 * | 7/2005 | Nitta et al. | ..................... | 706/46 |
| 2005/0203970 A1 * | 9/2005 | McKeown et al. | .......... | 707/203 |
| 2006/0010146 A1 * | 1/2006 | Nayak | ......................... | 707/100 |
| 2006/0026517 A1 * | 2/2006 | Weir | ........................... | 715/533 |
| 2006/0074727 A1 * | 4/2006 | Briere | ........................... | 705/8 |
| 2006/0129384 A1 * | 6/2006 | Sites | ............................ | 704/10 |
| 2006/0143564 A1 * | 6/2006 | Bates et al. | ................. | 715/533 |
| 2006/0173806 A1 * | 8/2006 | Bruecken | ........................ | 707/1 |

OTHER PUBLICATIONS

Radue, On the Design of an Interactive Spelling Dictionary for Personal Computer, ACM 1983, pp. 197-199.*

(Continued)

*Primary Examiner*—Cong-Lac Huynh
(74) *Attorney, Agent, or Firm*—Paul A. Harrity

(57) ABSTRACT

A method includes identifying a document corpus, creating a dictionary based on words in the document corpus, identifying a potentially misspelled word in a document, and providing a word from the dictionary as likely to correspond to the potentially misspelled word.

25 Claims, 15 Drawing Sheets

OTHER PUBLICATIONS

Turba, Checking for Spelling and Typographical Errors in Computer-Based Text, ACM 1981, pp. 51-60.*

Peterson, Computer Programs for Detecting and Correcting Spelling Errors, ACM 1980, pp. 676-687.*

Hodge et al., A Comparison of Standard Spell Checking Algorithms and a Novel Binary Neural Approach, IEEE 2001, pp. 1073-1081.*

Taghva et al., Post-Editing through Approximation and Global Correction, Google Mar. 1993, pp. 1-12.*

* cited by examiner

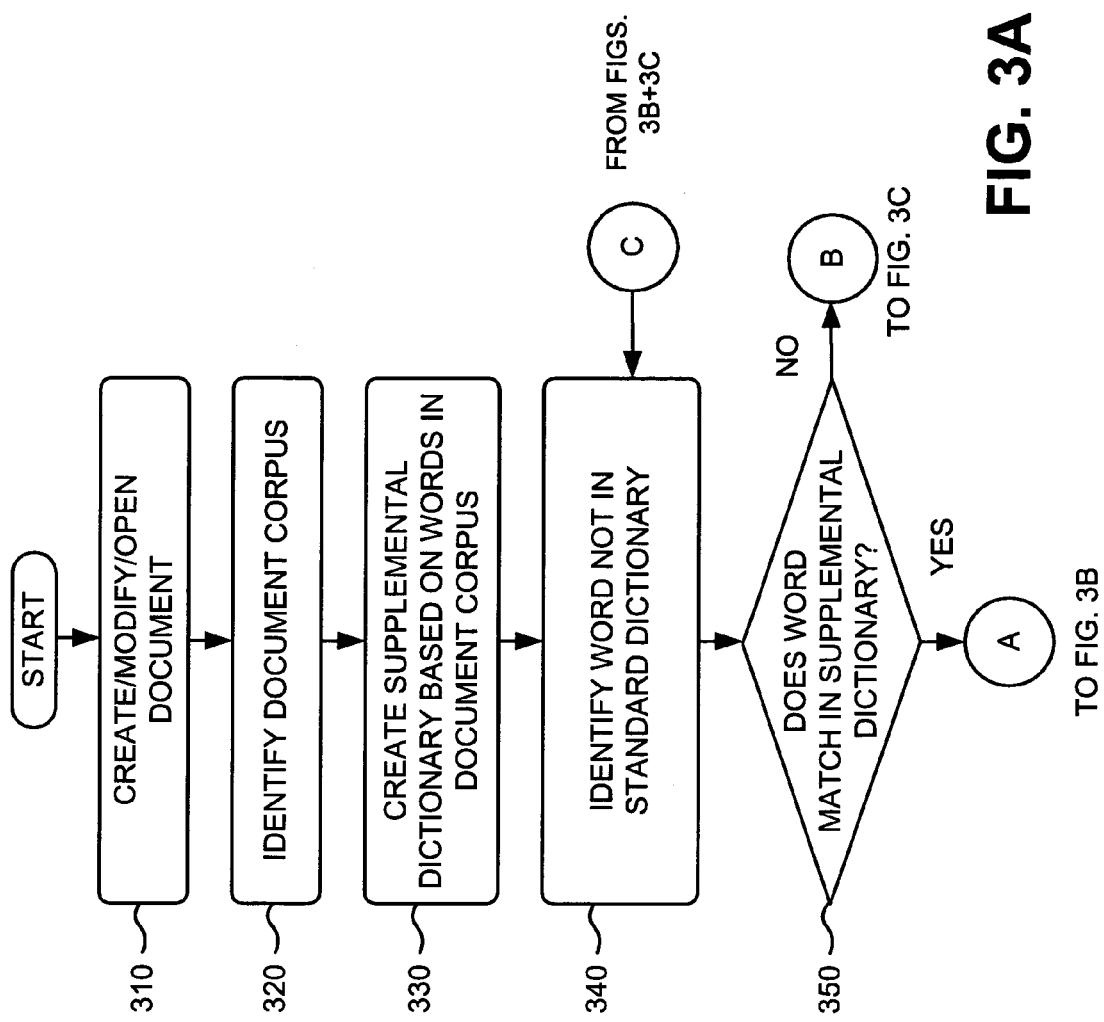

SELECT DOCUMENT(S) FOR DOCUMENT CORPUS

- ☐ MY COMPUTER
  - ☐ 3-1/2 FLOPPY (A:)
  - ☐ LOCAL DISK (C:)
  - ☐ REMOVABLE DISK (D:)
  - ☐ CD DRIVE (E:)
- ☐ MY NETWORK PLACES
- ☐ INTERNET ADDRESS(ES)

[DONE] [CANCEL]

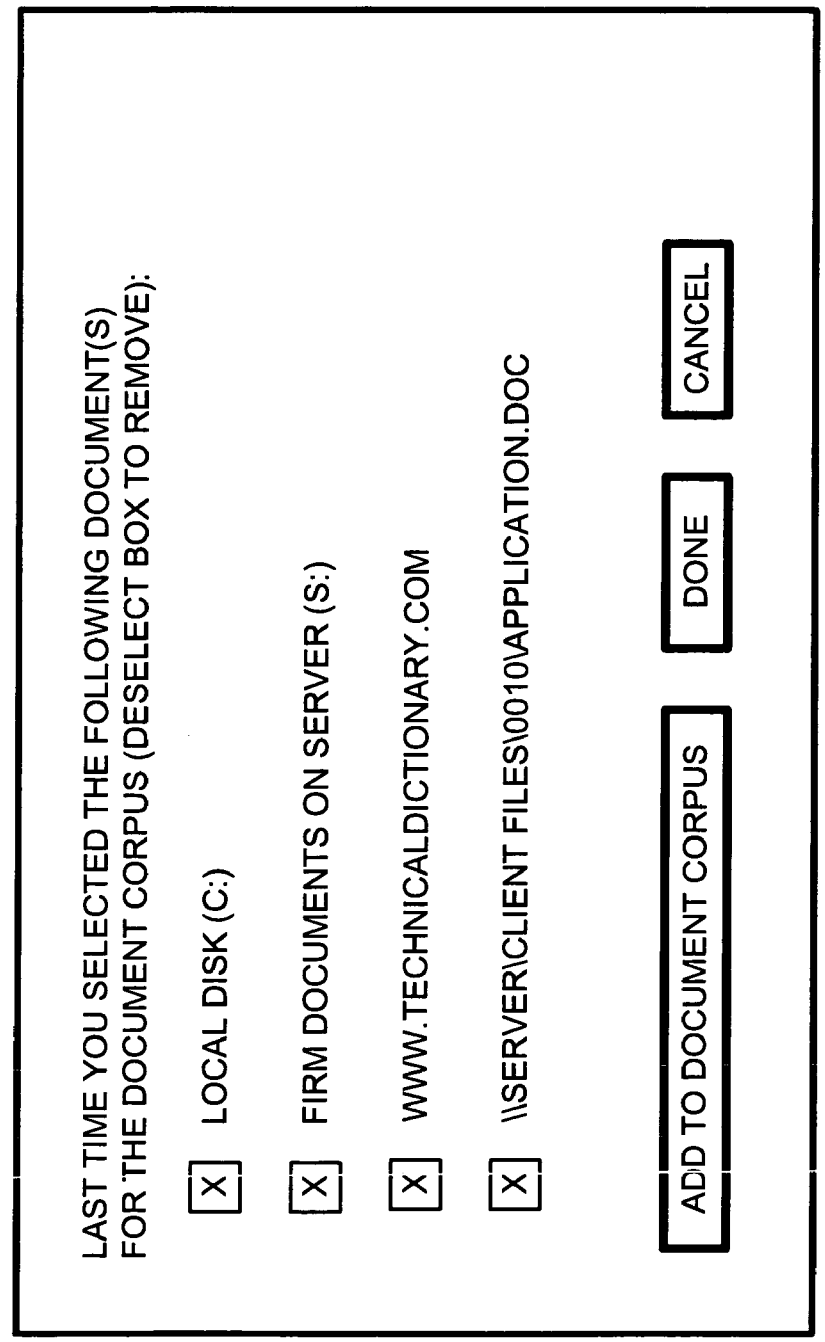

transmission of data bytes from the source register 110 to the destination register 120. Fig. 4 is a detailed diagram of the data packer 130 according to an implementation consistent with the present invention. The data packer 130 may include a (multiplexor) 410 and a comparator 420 corresponding to each of the storage locations 310 (Fig. 3) in the destination register 120.

The (multiplexer) 410 may include a conventional multiplexing device that receives multiple inputs and outputs

FIG. 6 transmission of data bytes from the source register 110 to the destination register 120. Fig. 4 is a detailed diagram of the data packer 130 according to an implementation consistent with the present invention. The data packer 130 may include a multiplexor 410 and a comparator 420 corresponding to each of the storage locations 310 (Fig. 3) in the destination register 120.

The multiplexer 410 may include a conventional multiplexing device that receives multiple inputs and outputs

FIG. 7 transmission of data bytes from the source register 110 to the destination register 120. Fig. 4 is a detailed diagram of the data packer 130 according to an implementation consistent with the present invention. The data packer 130 may include a multiplexor 410 and a comparator 420 corresponding to each of the storage locations 310 (Fig. 3) in the destination register 120.

The multiplexer 410 may include a conventional multiplexing device that receives multiple inputs and outputs

FIG. 8

CORRECTION OF MISSPELLED WORDS

BACKGROUND

1. Field of the Invention

Systems and methods consistent with the principles of the invention relate generally to word processing and, more particularly, to the correction of misspelled words in documents.

2. Description of Related Art

Existing spelling correction systems, such as those found in many of today's word processing applications, check whether each word in a document is found in a limited dictionary database. When a word is not found in the dictionary database, the systems flag the word as being misspelled. Some systems also provide suggestions for replacing the misspelled word with its correctly-spelled counterpart, which may be determined by, for example, inserting, deleting, and/or transposing characters in the misspelled word.

SUMMARY

According to one aspect, a method may include identifying a document corpus, creating a dictionary based on words in the document corpus, identifying a potentially misspelled word in a document, and providing a word from the dictionary as likely to correspond to the potentially misspelled word.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 5A–11 are exemplary diagrams illustrating the processing of FIGS. 3A–4 according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Overview

Dictionaries used in applications, such as word processing applications, are often very limited in the words that they include. Oftentimes, such dictionaries lack words specific to a particular field, such as common medical, legal, and/or technical words. These dictionaries also typically lack other types of common words, such as names of streets, businesses, and/or people.

Systems and methods consistent with the principles of the invention may create a dictionary to supplement the standard dictionary of an application, such as a word processing application, based on a document corpus. The systems and methods may then suggest correctly spelled words for misspelled words in a document based on the standard and supplemental dictionaries.

Exemplary System

Figure 1:
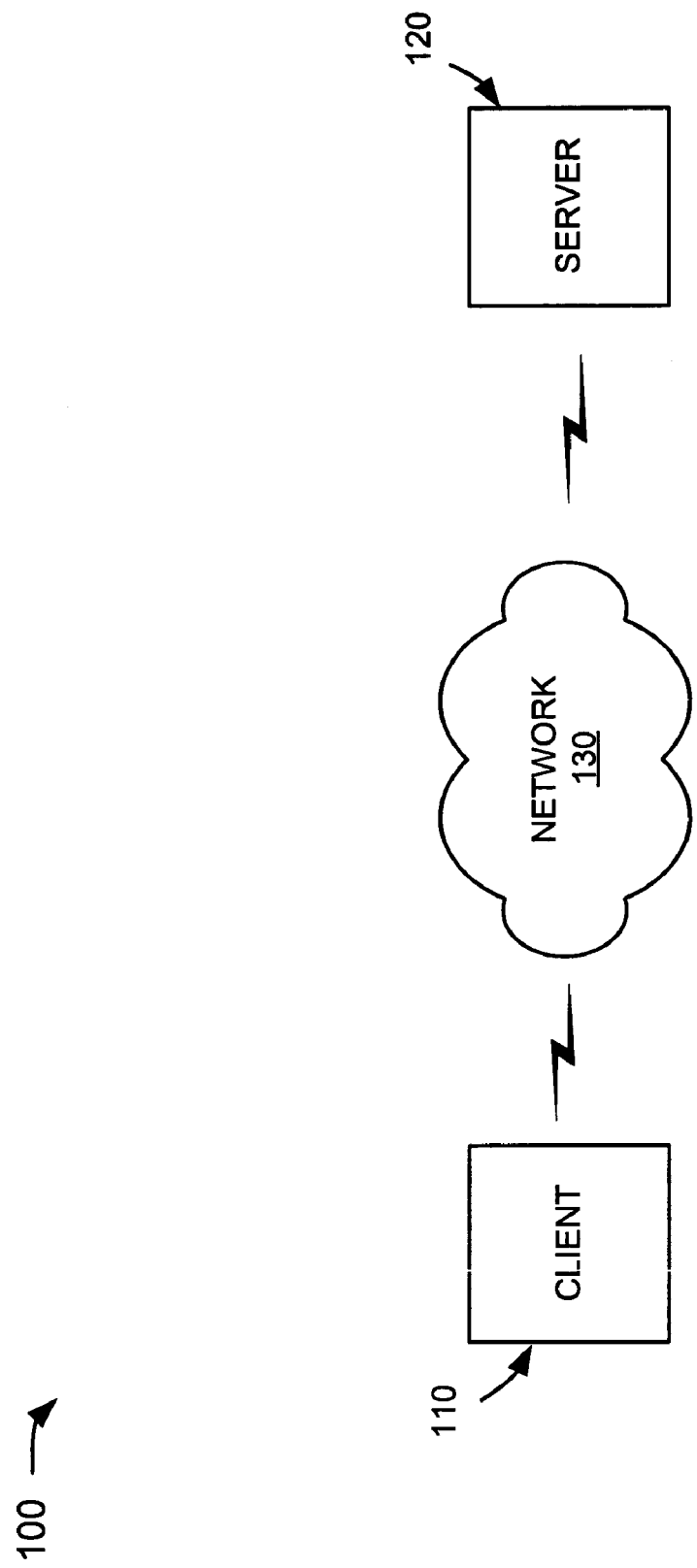
FIG. 1 is a diagram of an exemplary system in which systems and methods consistent with the principles of the invention may be implemented.

FIG. 1 is an exemplary diagram of a system 100 in which systems and methods consistent with the principles of the invention may be implemented. System 100 may include a client 110 connected to a server 120 via a network 130. A single client 110 and server 120 have been illustrated as connected to network 130 for simplicity. In practice, there may be more or fewer clients and servers. Also, in some instances, a client may perform the functions of a server and/or a server may perform the functions of a client.

A client 110 may include a client entity. An entity may be defined as a device, such as a personal computer, a wireless telephone, a personal digital assistant (PDA), a lap top, or another type of computation or communication device, a thread or process running on one of these devices, and/or an object executable by one of these devices. A server 120 may include a server entity that gathers, processes, and/or maintains documents in a manner consistent with the principles of the invention.

Network 130 may include a local area network (LAN), a wide area network (WAN), a telephone network, such as the Public Switched Telephone Network (PSTN), an intranet, the Internet, a memory device, or a combination of networks. Client 110 and server 120 may connect to network 130 via wired, wireless, and/or optical connections.

In an implementation consistent with the principles of the invention, server 120 may correspond to a local server and may communicate with client 110 via a local area network. In another implementation, server 120 may correspond to a web server and may communicate with client 110 via a wide area network, such as the Internet. In yet another implementation, system 100 may include no server 120 and client 110 may operate as a standalone device.

Exemplary Client Architecture

Figure 2:
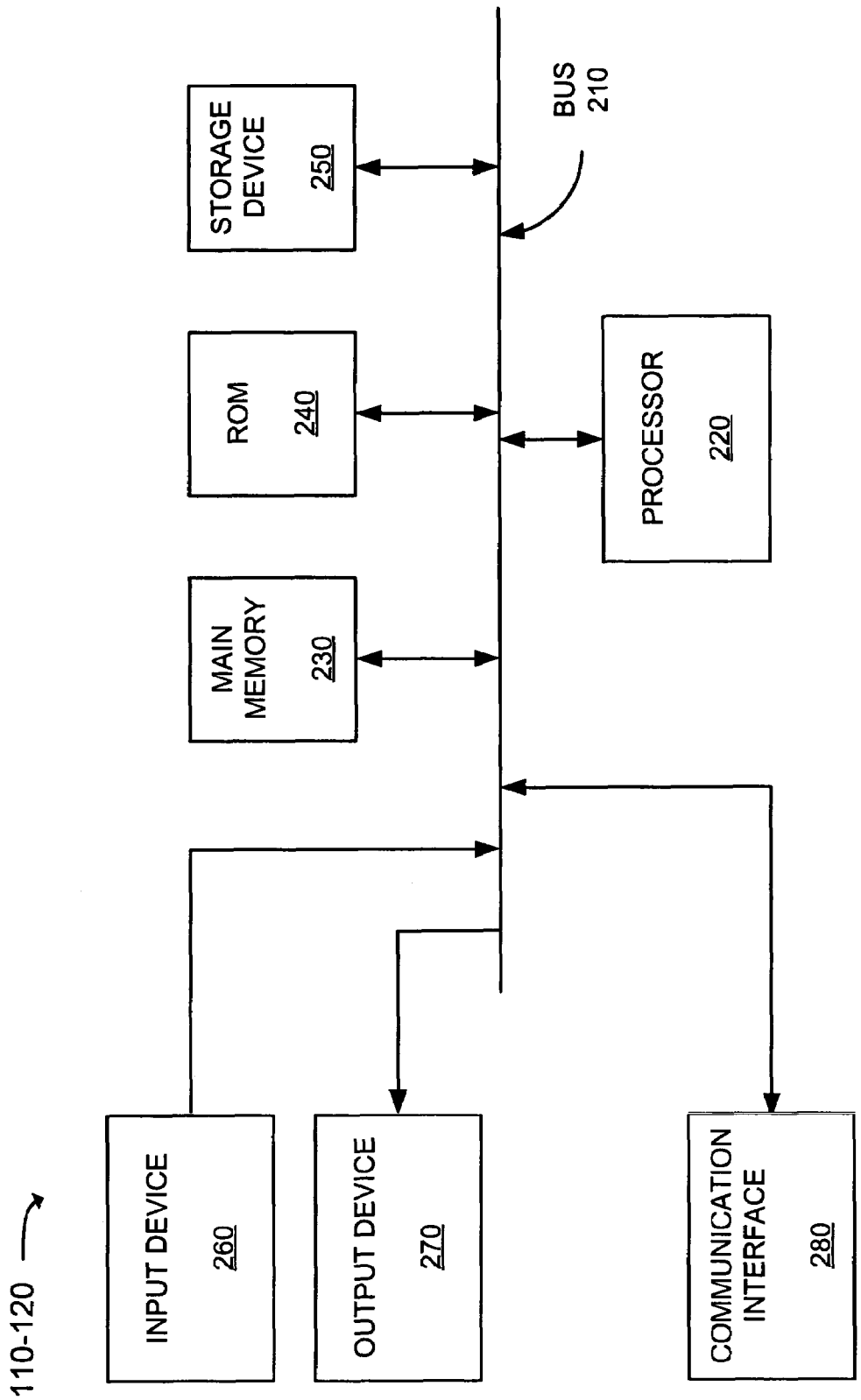

FIG. 2 is an exemplary diagram of client 110 according to an implementation consistent with the principles of the invention. Server 120 may be similarly configured. Client 110 may include a bus 210, a processor 220, a main memory 230, a read only memory (ROM) 240, a storage device 250, an input device 260, an output device 270, and a communication interface 280. Bus 210 may include a path that permits communication among the elements of client 110.

Processor 220 may include a conventional processor, microprocessor, or processing logic that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include a conventional mechanism that permits an operator to input information to client 110, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiverlike mechanism that enable client 110 to communicate with other devices and/or systems. For example, communication interface 280 may include mechanisms for communicating with another device or system via a network, such as network 130.

As will be described in detail below, client 110, consistent with the principles of the invention, may perform certain spell-checking operations. Client 110 may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 3B:
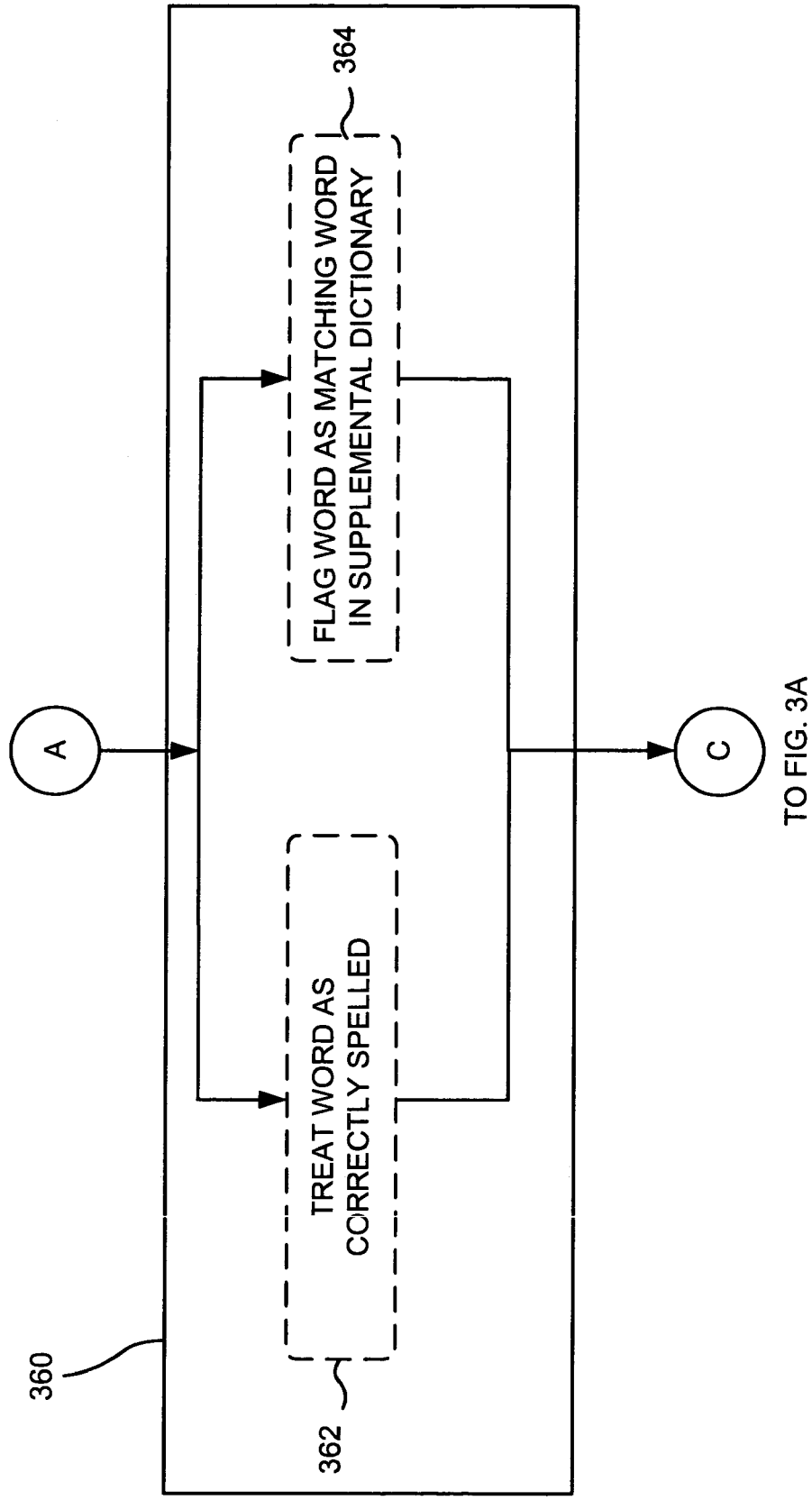
FIGS. 3A–4 are flowcharts of exemplary processing for correcting a misspelled word according to an implementation consistent with the principles of the invention.
Figure 3C:
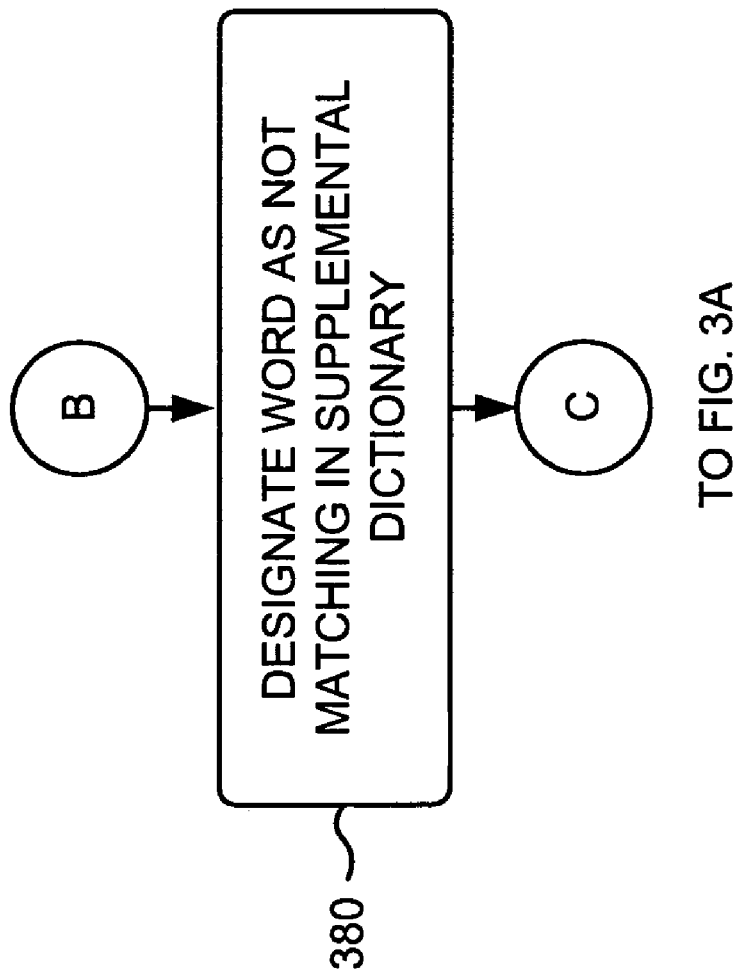
Figure 4:
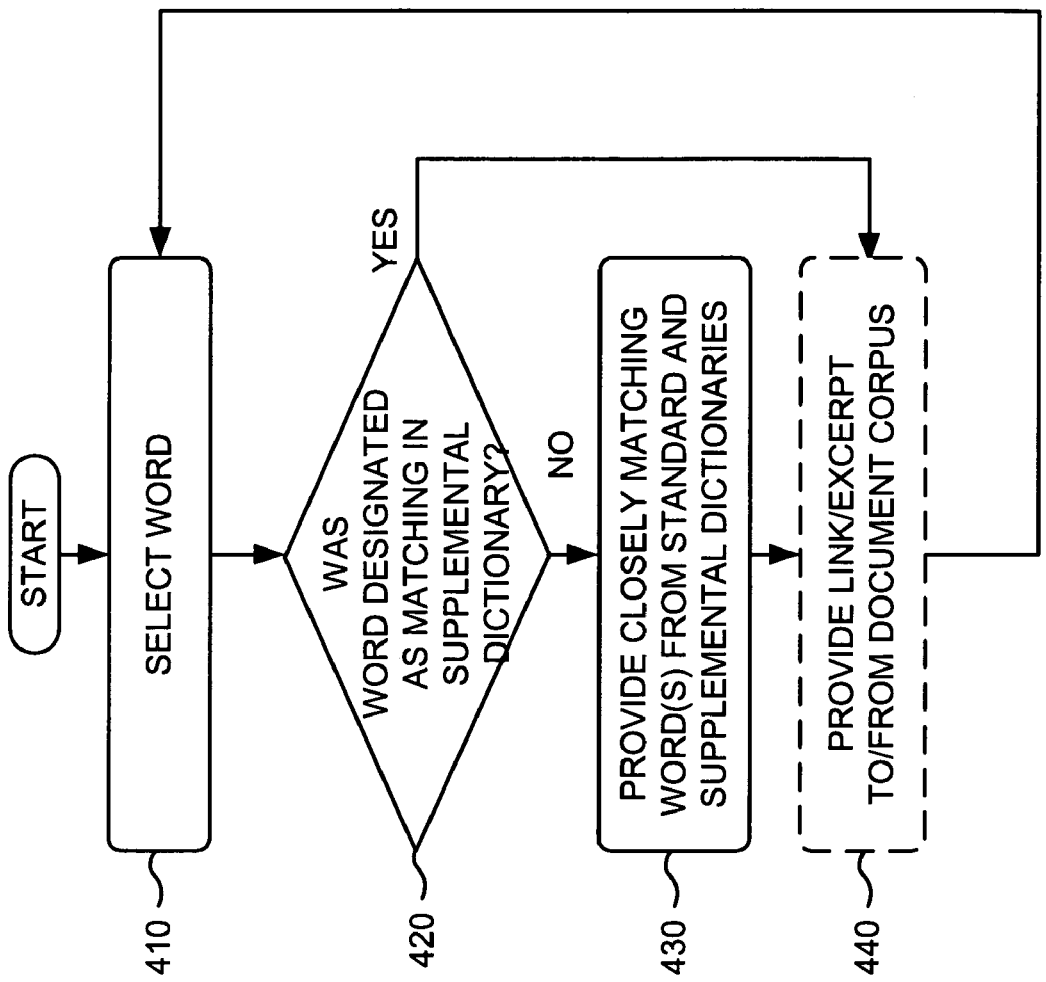

FIGS. 3A–4 are flowcharts of exemplary processing for correcting a misspelled word according to an implementation consistent with the principles of the invention. FIGS. 5A–11 are exemplary diagrams illustrating the processing of FIGS. 3A–4 according to an implementation consistent with the principles of the invention.

Processing may begin with the creating, modifying, or opening of a document (act 310) (FIG. 3A). The document may created, modified, or opened using an application, such as a word processing application (e.g., Microsoft Word, Corel WordPerfect, or Adobe Acrobat), a spreadsheet application (e.g., Microsoft Excel), a graphics presentation application (e.g., Microsoft PowerPoint), a drawing application (e.g., Microsoft Visio), an e-mail application (e.g., Microsoft Outlook), or another type of application via which a user may enter text that may be misspelled.

A document corpus may be identified (act 320). The document corpus may include a single document or a group of documents. The document corpus may be identified on a per document basis. In other words, a user may identify a document corpus for each document the user creates, modifies, or opens. Alternatively, the document corpus may be identified for a series of documents that the user creates, modifies, or opens.

Examples of documents that may be selected for the document corpus include documents created using an application, such as one of the applications identified above (e.g., Word, WordPerfect, Acrobat, Excel, PowerPoint, Explorer, Visio, etc.) or an application used to create documents on the Internet (e.g., documents created using HTML or XML). A document of the document corpus may be located on client 110 or server 120, where server 120 may include a local server and/or a web server.

FIG. 5A illustrates an exemplary graphical user interface 500 that may facilitate the identification of documents for the document corpus according to an implementation consistent with the principles of the invention. Graphical user interface 500 may include a set of selectable boxes that may, in some cases, be hierarchically arranged. One set of selectable boxes may correspond to documents associated with client 110. For example, the user may be given the option of selecting "My Computer" and having all documents stored on client 110 included in the document corpus. The user may also be given the option of selecting documents associated with a 3½ floppy drive (A:), a local disk drive (C:), a removable disk drive (D:), and/or a CD drive (E:). Any or each of the options may permit the user to select individual folders and/or documents associated with the drive.

Another set of selectable boxes may correspond to documents associated with "My Network Places." These documents may correspond to documents that are accessible via a network, such as network 130. For example, these documents may be stored on a local server (or combination of servers) and/or a web server (or combination of servers), such as server 120.

Another set of selectable boxes may correspond to addresses of documents available on the Internet. The user may be given the option to enter an Internet address associated with a web document. The user may enter as many addresses as the user desires or select addresses from a web browser, a favorites list, or the like.

FIG. 5B illustrates an exemplary graphical user interface 550 that may facilitate the identification of documents for the document corpus according to another implementation consistent with the principles of the invention. Graphical user interface 550 may identify for the convenience of the user the documents that the user previously selected for the document corpus. The user may be given the option of removing any of these documents by, for example, deselecting the document's corresponding selectable box. The user may also be given the option to add documents to the document corpus. When the user selects this option, the user may be presented with a graphical user interface similar to graphical user interface 500 (FIG. 5A).

Returning to FIG. 3A, a supplemental dictionary may be created based on words in the document(s) of the document corpus (act 330). In one implementation, a table of words may be created based on the document corpus. The table may identify words and in which documents(s) the words occur. Optionally, the table may also identify how many times a word occurs in a document or over a group of documents in the document corpus and/or where the word occurs in the document(s). In one implementation, the table may remove words that occur less than a threshold number of times in a document (e.g., a word occurring less than three times in any document of the document corpus may be removed) or a threshold number of times across a group of documents (e.g., a word occurring in less than five different documents of the document corpus may be removed). In other implementations, the supplemental dictionary may be formed in other ways known to those skilled in the art.

A word not in a standard dictionary may be identified (act 340). The standard dictionary may include a dictionary associated with the application the user is using to create, modify, or open the document. For example, many existing software applications (e.g., Word, WordPerfect, Acrobat, PowerPoint, Explorer, etc.) include standard dictionaries that a user may use to check for misspelled words in a document. A word that does not appear in the standard dictionary may be flagged in some manner as a potentially misspelled word. FIG. 6 is an exemplary diagram of a document in which the words "multiplexor" and "multiplexer" are identified as words not in a standard dictionary.

Returning to FIG. 3A, it may be determined whether the word matches a word in the supplemental dictionary (act 350). For example, the supplemental dictionary may be searched for an occurrence of the word. In one implementation, a match is determined if the word appears in the supplemental dictionary and its number of occurrences in a document or over a group of documents exceeds a threshold. In another implementation, a match is determined for any occurrence of the word in the supplemental dictionary.

If a match occurs (act 350), then the word may be designated as matching a word in the supplemental dictionary (act 360) (FIG. 3B). In one implementation, the word may be treated as if it were correctly spelled (act 362). In this case, the flag associated with the word to identify the word as a potentially misspelled word may be removed. Processing may then return to act 340 (FIG. 3A) where another word may be identified as not being in the standard dictionary.

In another implementation, the flag associated with the word to identify the word as a potentially misspelled word may be changed to a different type of flag, such as one that identifies the word as one that does not match a word in the standard dictionary, but matches a word in the supplemental dictionary (act 364). Processing may then return to act 340 (FIG. 3A) where another word may be identified as not being in the standard dictionary.

If a match does not occur (act 350) (FIG. 3A), then the word may be designated as not matching in the supplemental dictionary (act 380) (FIG. 3C). In this case, the flag associated with the word to identify the word as a potentially misspelled word may be changed to a different type of flag, such as one that identifies the word as one that does not match a word in the standard dictionary or the supplemental dictionary. Processing may then return to act 340 (FIG. 3A) where another word may be identified as not being in the standard dictionary.

FIGS. 7 and 8 are exemplary diagrams of a document that illustrates the processing of acts 360–380 of FIGS. 3B and 3C. In the exemplary diagram of FIG. 7, the word "multiplexor" has been designated as not being in either the standard dictionary or the supplemental dictionary (as described with respect to act 380) and the word "multiplexer" has been designated as not being in the standard dictionary, but being in the supplemental dictionary (as described with respect to act 360). The word "multiplexor," in this example, is visually distinguished by marking the word with underlining. In other implementations, the word may be visually distinguished in other ways, such as by changing other attributes associated with the word (e.g., font, size, color, etc.). The word "multiplexer," in this example, is not visually distinguished from other text of the document.

In the exemplary diagram of FIG. 8, the word "multiplexor" has been designated as not being in either the standard dictionary or the supplemental dictionary (as described with respect to act 380) and the word "multiplexer" has been designated as not being in the standard dictionary, but being in the supplemental dictionary (as described with respect to act 370). The word "multiplexor," in this example, is visually distinguished by marking the word with underlining. In other implementations, the word may be visually distinguished in other ways, such as by changing other attributes associated with the word (e.g., font, size, color, etc.). The word "multiplexer," in this example, is also visually distinguished by marking the word with underlining different from the underlining associated with "multiplexor." In other implementations, the word may be visually distinguished in other ways, such as by changing other attributes associated with the word (e.g., font, size, color, etc.). In any event, the words "multiplexor" and "multiplexer" may be visually distinguished in different ways to show that one of the words was in the supplemental dictionary while the other was not.

At some point, one of the words in the document may be selected (act 410) (FIG. 4). Selection of the word may occur as a result of the user activating the spell checking software associated with the application. Alternatively, selection of the word may occur as a result of a user selecting the word using, for example, a mouse and cursor (e.g., right clicking on the word).

It may then be determined whether the word was designated as matching a word in the supplemental dictionary (act 420). If not, a closely matching word or words from the standard and supplemental dictionaries may be provided (act 430). A closely matching word may refer to a word that is likely to correspond to the potentially misspelled word. Several techniques exist for identifying closely matching words. For example, closely matching words may be identified by replacing one or more letters of the potentially misspelled word, dropping one or more letters of the potentially misspelled word, and/or adding one or more letters to the potentially misspelled word to obtain words that are either in the standard dictionary or the supplemental dictionary. In other implementations, yet other techniques may be used to identify closely matching words.

In one implementation, it may be required that a word in a document of the document corpus occur at least a threshold number of times to be a closely matching word. Alternatively or additionally, it may be required that a word occur at least a threshold number of times in different documents of the document corpus to be a closely matching word. In another implementation, a word need only occur once in a document of the document corpus to be a closely matching word. In this case, the threshold may be considered to be equal to one.

Figure 9A:
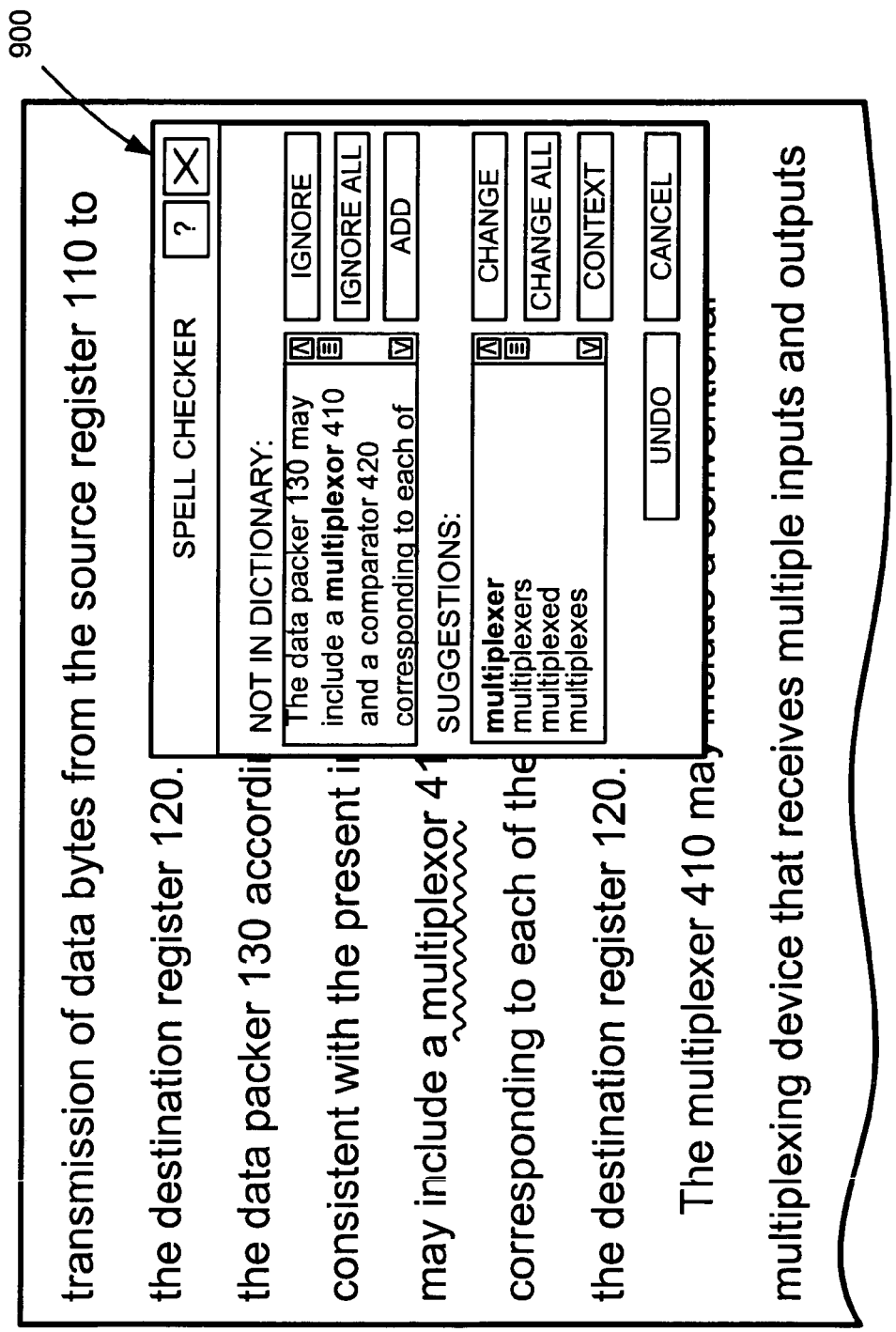
Figure 9B:
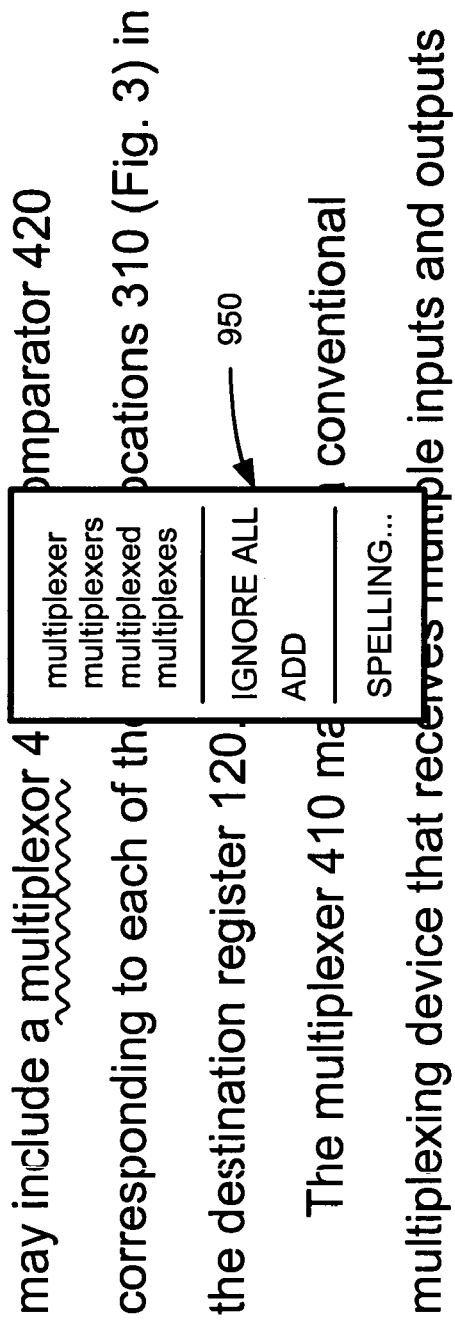

FIGS. 9A and 9B are exemplary diagrams that illustrate the processing of acts 410–430 of FIG. 4. In the exemplary diagram of FIG. 9A, a potentially misspelled word was selected by spell checking software associated with an application. In this case, the potentially misspelled word is "multiplexor." As shown in FIG. 9A, a spell checker window 900 may be provided. Spell checker window 900 may include an excerpt of the document that includes the potentially misspelled word in a "Not in Dictionary" section. Spell checker window 900 may also include a list of closely matching words from the standard dictionary and the supplemental dictionary in a "Suggestions" section.

The closely matching words may optionally be ranked in some manner. For example, the closely matching words may be ranked based on the number of times that the words appear in documents of the document corpus and/or where the words occur within documents of the document corpus. A word that occurs more times in a document of the document corpus may be ranked higher than a word that occurs fewer times in a document of the document corpus. Alternatively or additionally, a word that occurs in more documents of the document corpus may be ranked higher than a word that occurs in fewer documents of the document corpus. Alternatively or additionally, a word that occurs in a more prominent location within a document (e.g., in a title) may be ranked higher than a word that occurs in a less prominent location within a document (e.g., in a footer). In other implementations, other techniques may be used to rank the closely matching words.

Spell checker window 900 may also include a set of selectable items. One selectable item, "Ignore," may indicate that this occurrence of the potentially misspelled word should be considered a correct spelling. Another selectable item, "Ignore All," may indicate that all occurrences of the potentially misspelled word should be considered a correct spelling. A further selectable item, "Add," may indicate that the potentially misspelled word should be added to the standard dictionary. Another selectable item, "Change," may indicate that this occurrence of the potentially misspelled word should be replaced with a selected one of the closely matching words. Yet another selectable item, "Change All," may indicate that all occurrences of the potentially misspelled word should be replaced with a selected one of the closely matching words. A further selectable item, "Context," may indicate that context of a selected one of the closely matching words should be provided, as will be described in more detail below. Another selectable item, "Undo," may indicate that a previous operation should be undone. A further selectable item, "Cancel," may indicate that the spell checking operation should terminate.

In the exemplary diagram of FIG. 9B, a potentially misspelled word was selected by the user using, for example, a right click of a mouse. In this case, the potentially misspelled word is again "multiplexor." As shown in FIG. 9B, a window 950 may be provided. Window 950 may include a list of closely matching words from the standard dictionary and the supplemental dictionary. In one implementation, the closely matching words may optionally be ranked in some manner, as described above.

Window 900 may also include a set of selectable items. One selectable item, "Ignore All," may indicate that all occurrences of the potentially misspelled word should be considered a correct spelling. A further selectable item, "Add," may indicate that the potentially misspelled word should be added to the standard dictionary. Another selectable item, "Spelling . . . ," may indicate that the spell checking software should be initiated.

Returning to FIG. 4, a link to a document in the document corpus and/or an excerpt from a document in the document corpus may optionally be provided (act 440). The document and/or the excerpt from the document may provide context for one of the closely matching words. This may aid the user in determining which of the words to select to replace the potentially misspelled word.

Figure 10:
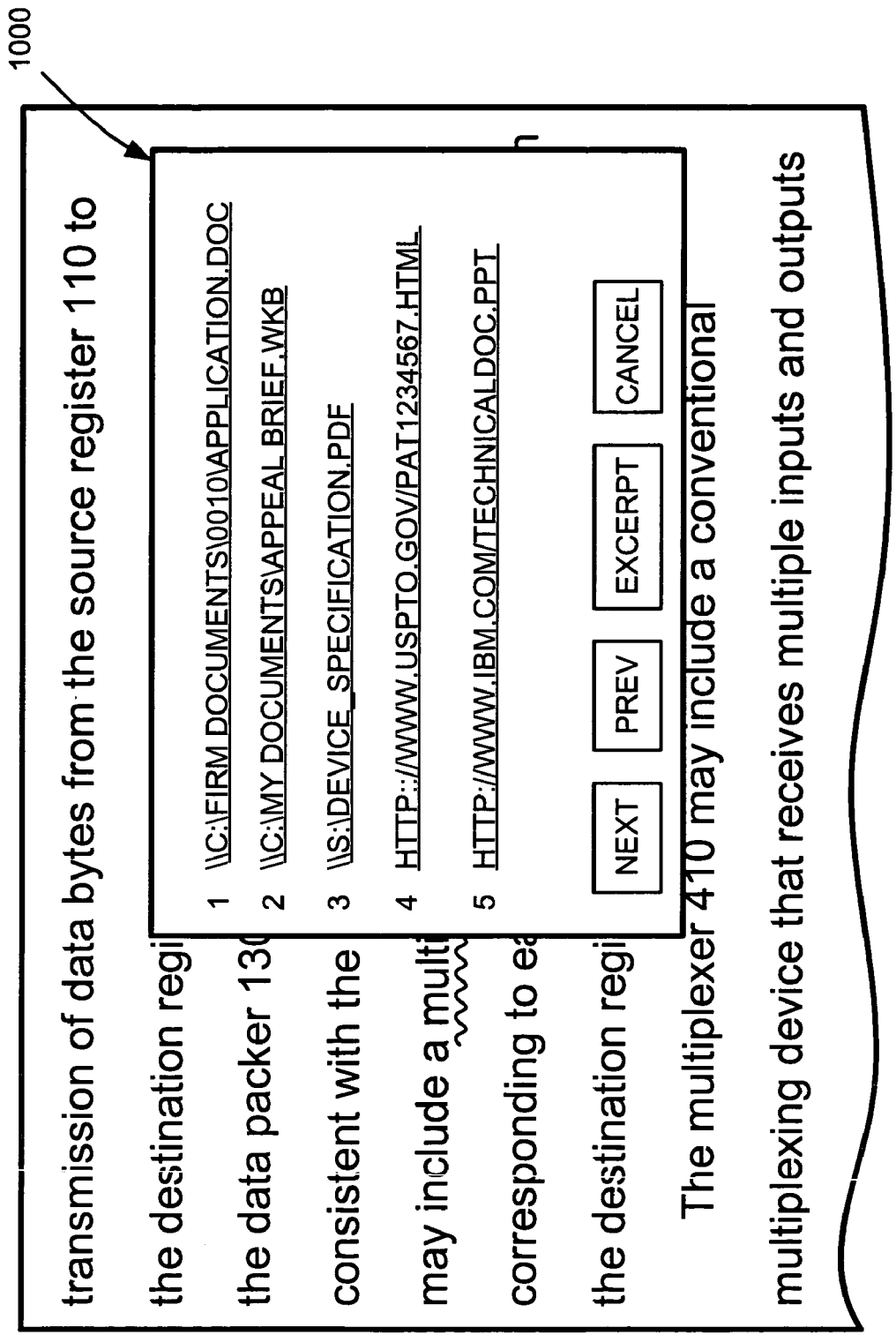

FIG. 10 is an exemplary diagram for presenting a list of links to documents in the document corpus. A window 1000 may be presented that includes a list of links to documents that contain a selected one of the closely matching words. When one of these links is selected, the associated document may be provided via the same or a different window. The closely matching word may be visually distinguished in some manner (e.g., highlighted) in the document.

The links may optionally be ranked in some manner. For example, the links may be ranked based on the number of occurrences of the closely matching word in the associated document or where the closely matching word occurs within the associated document. A link associated with a document that includes more occurrences of the word may be ranked higher than a link associated with a document that includes fewer occurrences of the word. Alternatively or additionally, a link associated with a document in which the word occurs in a more prominent location (e.g., in a title) may be ranked higher than a link associated with a document in which the word occurs in a less prominent location (e.g., in a footer). In other implementations, other techniques may be used to rank links.

Window 1000 may permit the user to select a next set of links (if available) or a previous set of links (if available). Window 1000 may also permit the user to be presented with an excerpt from a document corresponding to one of the links, possibly instead of or prior to, being presented with the entire document.

Figure 11:
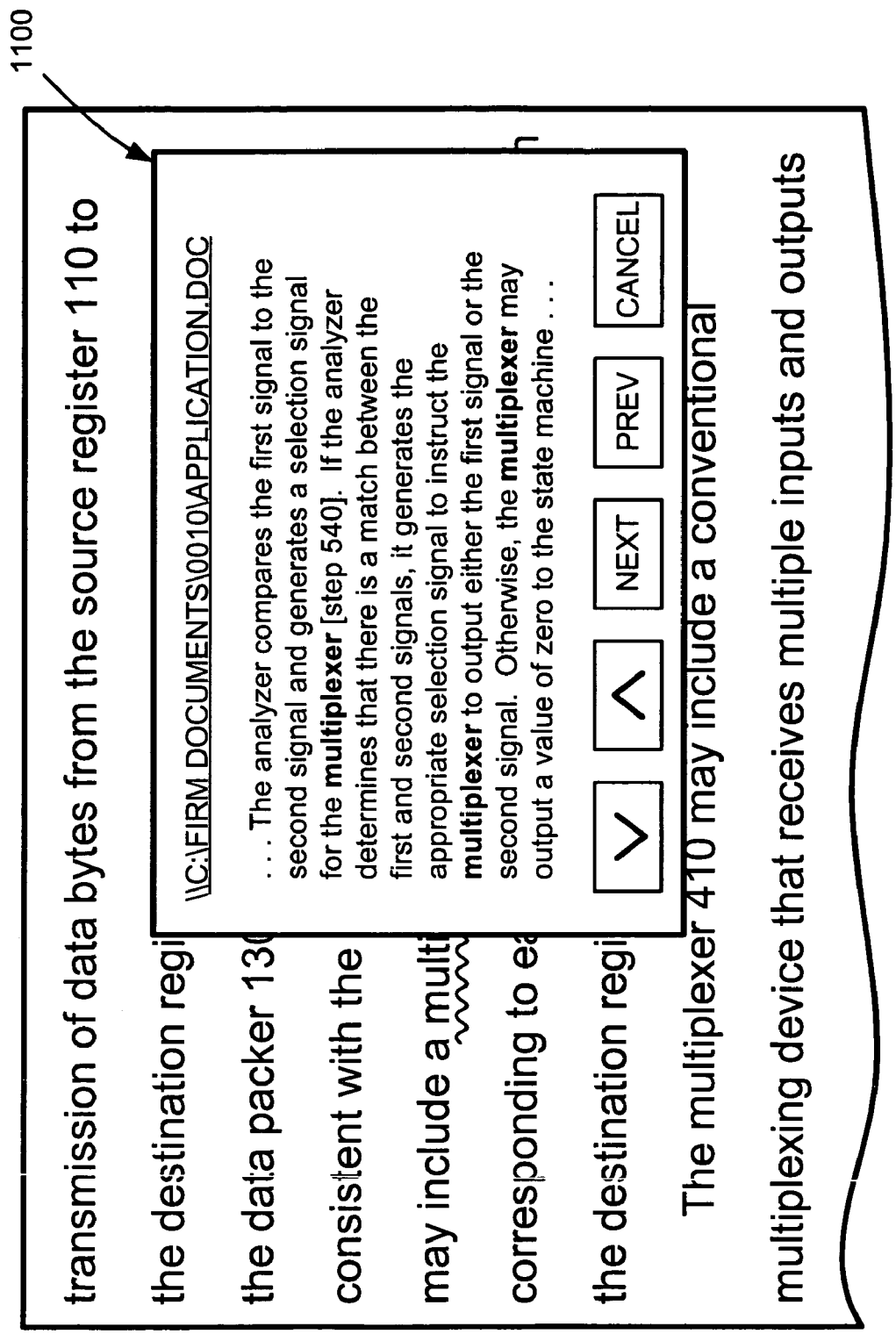

FIG. 11 is an exemplary diagram for presenting an excerpt from a document in the document corpus. A window 1100 may be presented that includes a link to and an excerpt from a document that contains a selected one of the closely matching words. When the link is selected, the associated document may be provided via the same or a different window. The closely matching word may be visually distinguished in some manner (e.g., highlighted) in the document.

The document presented via window 1100 may correspond to one of a list of optionally ranked documents that contain the closely matching word. For example, the documents may be ranked based on the number of occurrences of the closely matching word in the documents or where the closely matching word occurs within the documents. A document that includes more occurrences of the word may be ranked higher than a document that includes fewer occurrences of the word. Alternatively or additionally, a document in which the word occurs in a more prominent location (e.g., in a title) may be ranked higher than a document in which the word occurs in a less prominent location (e.g., in a footer). In other implementations, other techniques may be used to rank documents.

Window 1100 may permit the user to be presented with a next excerpt (if available) or a previous excerpt (if available) within the same document. Window 1100 may also permit the user to be presented with an excerpt from a next document (if one exists) or a previous document (if one exists).

CONCLUSION

Systems and methods consistent with the principles of the invention may create a dictionary to supplement the standard dictionary of an application based on a document corpus. The systems and methods may then suggest correctly spelled words for potentially misspelled words in a document based on the standard and supplemental dictionaries.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 3A–4, the order of the acts may be modified in other implementations consistent with the principles of the invention. Further, non-dependent acts may be performed in parallel.

In one exemplary implementation, the document corpus may be identified and the supplemental dictionary created after opening a document or during creation or modification of a document. For example, the user, at any time, may select or change which documents are included in the document corpus. The supplemental dictionary may then be created after opening the document or during creation or modification of the document. For example, the supplemental dictionary may be created during idle periods, such as between keystrokes, while the user operates upon the document.

In another exemplary implementation, the document corpus may be identified and/or the supplemental dictionary created prior to the user opening a document. For example, the user may select or change which documents are included in the document corpus independent of any particular document to be opened, created, or modified. The supplemental dictionary may then be created prior to the user opening a document—independent of any particular document.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed is:

1. A computer-readable storage medium that stores instructions executable by a processor to perform a method for checking spelling of a document opened, created, or modified by a software application, comprising:
    instructions for providing a first dictionary associated with the software application;
    instructions for identifying a document corpus;
    instructions for creating a second dictionary based on words in the document corpus;
    instructions for identifying a potentially misspelled word in the document opened, created, or modified by the software application as a word that does not match any word in the first dictionary;
    instructions for determining whether the potentially misspelled word matches a word in the second dictionary, where the match is determined when the word in the second dictionary occurs at least a threshold number of times in the document corpus or in a document in the document corpus;
    instructions for providing a word from the second dictionary as likely to correspond to the potentially misspelled word when no word in the second dictionary matches the potentially misspelled word; and
    instructions for one of visually marking the potentially misspelled word in the document as matching in the second dictionary or treating the potentially misspelled word as correctly spelled when the potentially misspelled word matches a word in the second dictionary.

2. The computer-readable storage medium of claim 1, wherein the instructions for identifying the document corpus include instructions for presenting a user interface to a user to permit the user to select one or more documents to include in the document corpus.

3. The computer-readable storage medium of claim 1, wherein the instructions for creating the second dictionary include instructions for generating the second dictionary after opening the document using the software application.

4. A computer-readable storage medium that stores instructions executable by a processor to perform a method for checking spelling of a document opened, created, or modified by a software application, comprising:
    instructions for creating a dictionary based on words in a document corpus;
    instructions for identifying a potentially misspelled word in the document opened, created, or modified by the software application;
    instructions for providing a word from the dictionary as likely to correspond to the potentially misspelled word when no word in the dictionary matches the potentially misspelled word; and
    instructions for designating the potentially misspelled word as matching in the dictionary when the potentially misspelled word matches a word in the dictionary, where the match is determined when the word in the dictionary occurs at least a threshold number of times in the document corpus or in a document in the document corpus.

5. The computer-readable storage medium of claim 4, further comprising:
    instructions for providing another dictionary associated with the software application; and
    instructions for identifying potentially misspelled words in the document as words that do not match the other dictionary.

6. The computer-readable storage medium of claim 4, wherein the instructions for providing a word from the dictionary comprise:
    instructions for identifying a plurality of words in the dictionary that correspond to the potentially misspelled word,
    instructions for ranking the plurality of words, and
    instructions for presenting the ranked words.

7. The computer-readable storage medium of claim 4, wherein the instructions for designating the potentially misspelled word as matching in the dictionary comprise one of:
    instructions for treating the potentially misspelled word as correctly spelled, or
    instructions for visually marking the potentially misspelled word in the document as matching in the dictionary.

8. The computer-readable storage medium of claim 4, further comprising:
    instructions for providing a link to a document in the document corpus that contains the word from the dictionary.

9. The computer-readable storage medium of claim 4, further comprising:
    instructions for providing an excerpt from a document in the document corpus that contains the word from the dictionary.

10. The computer-readable storage medium of claim 4, further comprising:
    instructions for presenting a user interface to a user to permit the user to select one or more documents to include in the document corpus.

11. The computer-readable storage medium of claim 4, wherein the instructions for creating the dictionary include instructions for generating the dictionary after opening the document using the software application.

12. A method, comprising
    identifying a document corpus;
    creating a dictionary based on words in the document corpus;
    identifying a potentially misspelled word in a document by identifying a word in the document that does not appear in a second dictionary is different from the dictionary created based on the words in the document corpus;

determining whether the identified word matches a word in the dictionary;

designating the identified word as matching a word in the dictionary when the identified word matches a word in the dictionary, where the match is determined when the word in the dictionary occurs more than a threshold number of times in the document corpus or in a document in the document corpus; and providing a closely matching word from the dictionary or the second dictionary as likely to correspond to the identified word when the identified word does not match a word in the dictionary, where the closely matching word is identified by replacing one or more letters of the identified word, dropping one or more letters of the identified word, and/or adding one or more letters to the identified word to identify a word in at least one of the dictionary or the second dictionary.

13. The method of claim 12, wherein the document corpus is identified on a per-document basis.

14. The method of claim 12, wherein the document corpus is identified for a set of documents.

15. The method of claim 12, wherein the document corpus comprises a single document.

16. The method of claim 12, wherein the document corpus comprises a plurality of documents.

17. The method of claim 12, wherein identifying a document corpus comprises;

selecting a document from a set of available documents comprising at least one of word processing documents, spreadsheet documents, graphic presentation documents, drawing documents, e-mail documents, or web documents.

18. The method of claim 12, wherein designating the identified word as matching a word in the dictionary comprises one of:

treating the potentially misspelled word as correctly spelled, or visually marking the potentially misspelled word as matching a word in the dictionary.

19. The method of claim 12, wherein providing a closely matching word from the dictionary or the second dictionary comprises:

identifying a plurality of words in the dictionary that are likely to correspond to the identified word; and providing the plurality of words as likely to correspond to the identified word.

20. The method of claim 19, further comprising:

ranking the plurality of words based on at least one of a number of times that the plurality of words occur in the document corpus or where the plurality of words appear in the document corpus.

21. The method of claim 12, further comprising:

providing a link to a document in the document corpus that contains the word from the dictionary.

22. The method of claim 12, further comprising:

providing an excerpt from a document in the document corpus that contains the word from the dictionary.

23. The method of claim 12, wherein identifying the document corpus includes presenting a user interface to a user to permit the user to select one or more documents to include in the document corpus.

24. The method of claim 12, wherein creating the dictionary includes generating the dictionary after opening the document using a software application.

25. A system, comprising:

means for presenting a user interface to a user to permit the user to select one or more documents to include in a document corpus;

means for creating a first dictionary based on words in the document corpus;

means for identifying a potentially misspelled word in a document created, modified, or opened by the user, where the potentially misspelled word is identified as a word that does not appear in a second dictionary that is different from the first dictionary;

means for determining whether the potentially misspelled word matches a word found in the first dictionary;

means for designating the potentially misspelled word matching a word in the first dictionary when the potentially misspelled word matches a word in the first dictionary, where the match is determined when the word in the first dictionary occurs more than a threshold number of times in the document corpus or in a document in the document corpus; and means for providing a closely matching word from the first dictionary or the second dictionary as likely to correspond to the potentially misspelled word when the potentially misspelled word does not match a word in the first dictionary, where the closely matching word is identified by at least one of replacing one or more letters of the potentially misspelled word, dropping one or more letters of the potentially misspelled word, or adding one or more letters to the potentially misspelled word to identify a word that is in at least one of the first dictionary or the second dictionary.

* * * * *